US010250655B2

(12) United States Patent
Hurst et al.

(10) Patent No.: US 10,250,655 B2
(45) Date of Patent: Apr. 2, 2019

(54) SCHEDULING SEGMENT DATA DELIVERY IN AN ADAPTIVE MEDIA STREAM TO AVOID STALLING

(71) Applicant: Dish Technologies L.L.C., Englewood, CO (US)

(72) Inventors: Mark B. Hurst, Cedar Hills, UT (US); Herrick Muhlestein, Lindon, UT (US)

(73) Assignee: DISH TECHNOLOGIES L.L.C., Englewood, CO (US)

( * ) Notice: Subject to any disclaimer, the term of this patent is extended or adjusted under 35 U.S.C. 154(b) by 238 days.

(21) Appl. No.: 13/840,503

(22) Filed: Mar. 15, 2013

(65) Prior Publication Data

US 2014/0189099 A1    Jul. 3, 2014

Related U.S. Application Data

(60) Provisional application No. 61/747,960, filed on Dec. 31, 2012.

(51) Int. Cl.
| | | |
|---|---|---|
| G06F 15/173 | (2006.01) |
| H04L 29/06 | (2006.01) |
| H04N 21/437 | (2011.01) |
| H04N 21/442 | (2011.01) |
| H04N 21/6373 | (2011.01) |
| H04N 21/658 | (2011.01) |
| H04N 21/845 | (2011.01) |

(Continued)

(52) U.S. Cl.
CPC ........ H04L 65/601 (2013.01); H04L 65/4092 (2013.01); H04L 67/1002 (2013.01); H04N 21/437 (2013.01); H04N 21/44209 (2013.01); H04N 21/4622 (2013.01); H04N 21/6373 (2013.01); H04N 21/6581 (2013.01); H04N 21/8456 (2013.01); H04L 65/80 (2013.01)

(58) Field of Classification Search
CPC ........... H04N 21/437; H04N 21/44209; H04N 21/6373; H04N 21/6581; H04N 21/4622; H04N 21/8456; H04L 67/1002; H04L 65/601; H04L 65/4092; H04L 65/80
See application file for complete search history.

(56) References Cited

U.S. PATENT DOCUMENTS

| | | | |
|---|---|---|---|
| 7,324,555 B1 * | 1/2008 | Chen ................. | H04N 7/17336 348/E5.008 |
| 7,783,773 B2 * | 8/2010 | Wu et al. ..................... | 709/231 |

(Continued)

OTHER PUBLICATIONS

European Patent Office, International Search Report and Written Opinion, dated Mar. 24, 2014 for International Application No. PCT/US2013/078518.

(Continued)

*Primary Examiner* — Cheikh T Ndiaye
(74) *Attorney, Agent, or Firm* — Lorenz & Kopf LLP

(57) ABSTRACT

Methods, systems and devices are described to improve the performance of adaptive media streaming sessions. A media player device proactively requests segment data representing a media stream over multiple simultaneous network connections. Delivery of the requested segment data on each of the plurality of simultaneous connections is monitored, and subsequent requests for segment data are adapted based upon the monitored delivery of the requested segments on each of the plurality of simultaneous connections.

12 Claims, 3 Drawing Sheets

Figure 1:
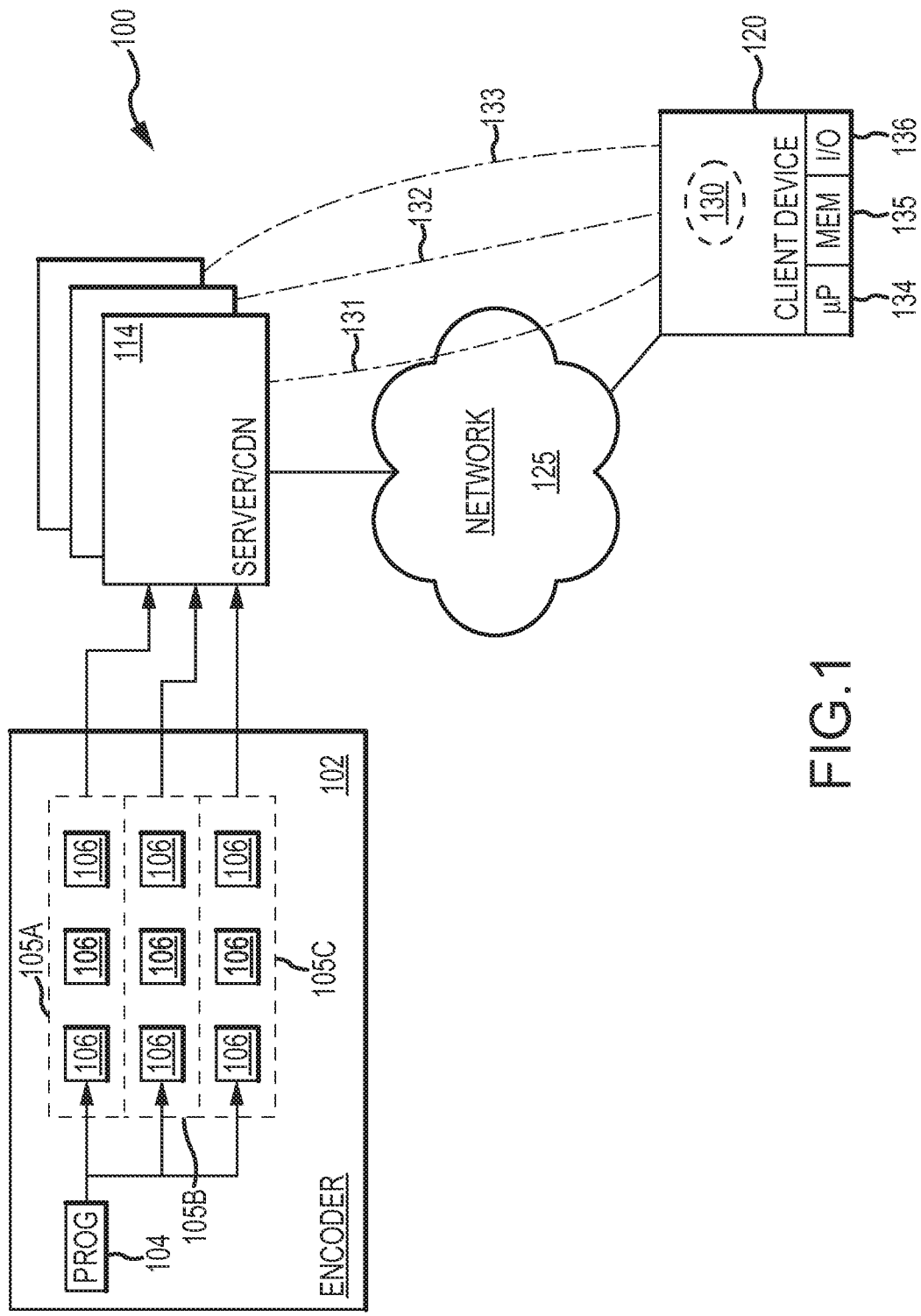

(51) Int. Cl.
*H04L 29/08* (2006.01)
*H04N 21/462* (2011.01)

(56) References Cited

U.S. PATENT DOCUMENTS

| 2005/0027788 | A1* | 2/2005 | Koopmans | H04L 67/32 |
| | | | | 709/200 |
| 2007/0005768 | A1* | 1/2007 | Won et al. | 709/225 |
| 2011/0222404 | A1* | 9/2011 | Watson | H04L 47/14 |
| | | | | 370/235 |
| 2012/0188868 | A1* | 7/2012 | Saavedra | 370/221 |
| 2014/0143431 | A1* | 5/2014 | Watson et al. | 709/227 |

OTHER PUBLICATIONS

Kusching R. et al., Improving Internet Video Streaming Performance by Parallel TCP-Based Request-Response Streams, Consumer Communications and Networking Conference (CCNC), 2010 7th IEEE, IEEE, Piscatway, NJ, USA, Jan. 9, 2010, pp. 1-5; XP031642982; ISBN: 978-1-4244-5175-3.

Thang, Truong Cong et al., Adaptive Streaming of Audiovisual Content using MPEG DASH, IEEE, IEEE Transactions on Consumer Electronics, vol. 58, No. 1, Feb. 2012.

The International Bureau of WIPO, International Preliminary Report on Patentability for International Application No. PCT/US2013/078518 dated Jul. 9, 2015.

Kristian Evensen et al: "Improving the performance of quality-adaptive video streaming over multiple heterogeneous access networks", MMSYS '11 Proceedings of the Second Annual ACM Conference on Multimedia Systems, vol. 25, Feb. 23, 2011 (Feb. 23, 2011), p. 57, XP055106209, New York, NY USA DOI: 10.1145/1943552.1943560.

Stephane Gouache et al: "Distributed & adaptive HTTP streaming", Multimedia and Expo (ICME), 2011 IEEE International Conference on, IEEE, Jul. 11, 2011 (Jul. 11, 2011), pp. 1-6, XP031964706, DOI: 10.1109/ICME.2011.6012028 ISBN: 978-1-61284-348-3.

European Patent Office, Communication pursuant to Article 94(3) EPC for Application No. 13 824 466.0-1908 dated Jul. 29, 2016.

* cited by examiner

SCHEDULING SEGMENT DATA DELIVERY IN AN ADAPTIVE MEDIA STREAM TO AVOID STALLING

PRIORITY CLAIM

This application claims priority to provisional application Ser. No. 61/747,960 filed on Dec. 31, 2012, which is incorporated herein by reference.

TECHNICAL FIELD

The present disclosure generally relates to streaming media content over the Internet or another network. More particularly, the following discussion relates to systems, methods and devices that allow a media player device to improve delivery of media stream data that is delivered over multiple simultaneous connections.

BACKGROUND

Media streaming is becoming an increasingly popular way of delivering television, movies and other media content to viewers. Media streams are typically point-to-point transmissions of digitized content that can be sent over the Internet or a similar network. Media streaming is often used to facilitate video on demand (VOD) services, remote storage digital video recorder (RSDVR) services, Internet Protocol television (IPTV) services, placeshifted media viewing and/or any number of other convenient services. Generally, the media stream is played back for the viewer in real time as the stream continues to be delivered to the player.

Often, media content is encoded into multiple sets of "streamlets" or other smaller segment files that can be individually requested and adaptively delivered to a particular client device. As changes in network bandwidth or other factors occur, the client device is able to react to the changes by requesting future segments that are encoded with different parameters (e.g., a higher or lower bit rate) for increased or decreased quality, as desired. Adaptive media streaming typically relies upon the media player client to control much of the streaming process. That is, the media player client, rather than the server, typically determines the next segment of the stream that will be requested and delivered to the player. Several examples of adaptive streaming systems, devices and techniques are described in US Patent Publication No. 2008/0195743, which is incorporated herein by reference.

It is therefore desirable to create systems, devices and methods that allow the client device to better control the adaptive streaming process. These and other desirable features and characteristics will become apparent from the subsequent detailed description and the appended claims, taken in conjunction with the accompanying drawings and this background section.

BRIEF SUMMARY

Several examples of methods, systems and devices to adapt requests for media stream segment data across multiple simultaneous connections are described.

In a first aspect, a media player device suitably requests segment data representing an adaptive media stream using two or more simultaneous data connections to one or more servers on the network. As data is received on the multiple connections, the player device may notice that different connections receive data at different rates. One connection, for example, may be noticeably faster or slower than the other connections. If a particularly fast or slow connection is identified, then subsequent requests for data to be delivered over that connection can be adapted to compensate for the different rates of delivery.

In a second aspect, the multiple connections can be further manipulated to obtain urgent but undelivered data. If a slow connection has not yet delivered segment data that will be needed in a relatively short period of time to prevent a disruption in playback, then requests placed on the other connections can be actively cancelled or otherwise scaled back so that the more urgent data is more likely to be delivered before it is needed. Alternatively, a priority request for the urgent data could be placed on a more reliable connection to increase the chances of receiving the data before a stall or other adverse effect occurs.

The various techniques and systems described herein allow the client device to more efficiently use its available resources, thereby improving the user experience. Additional and alternate embodiments, aspects and other features are described in more detail herein.

BRIEF DESCRIPTION OF THE DRAWING FIGURES

Figure 2:
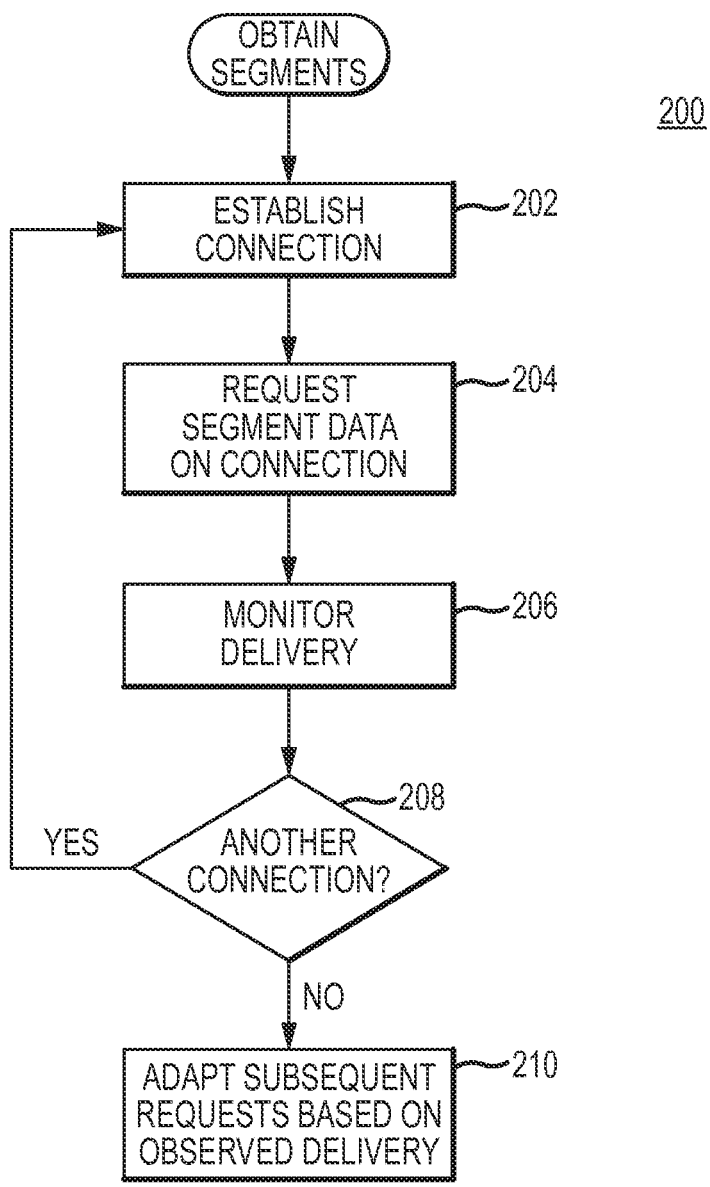
Figure 3:
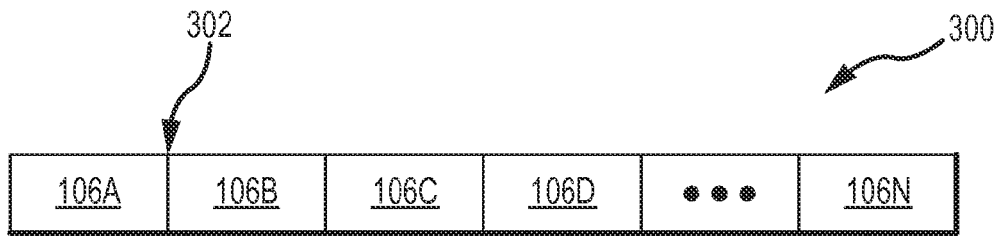
Figure 4:
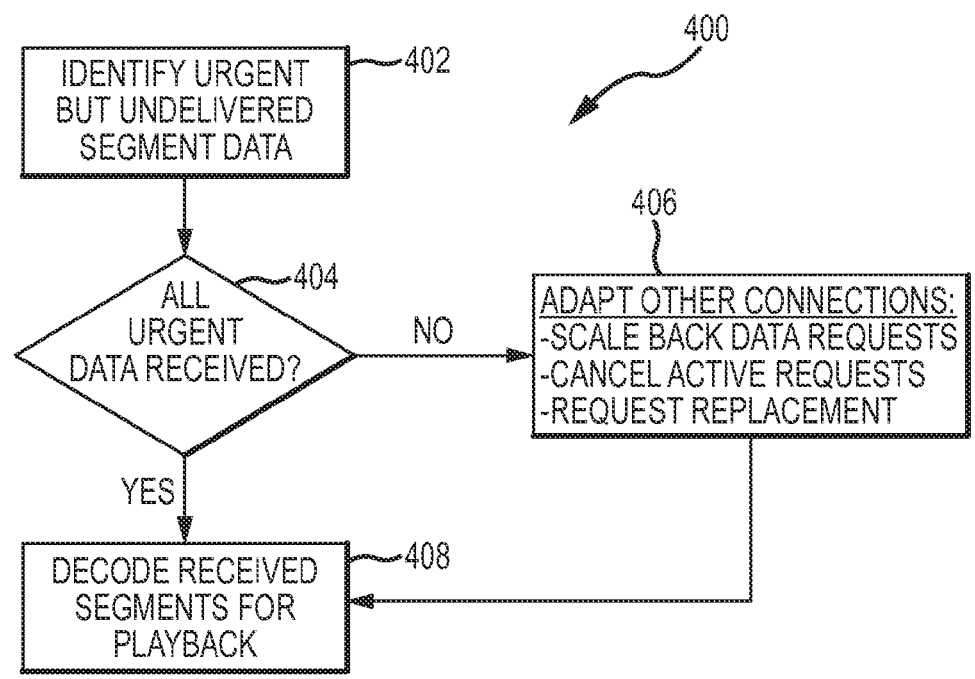

Exemplary embodiments will hereinafter be described in conjunction with the following drawing figures, wherein like numerals denote like elements, and FIG. 1 is a block diagram of an exemplary system for providing adaptive media streams in a data network;

FIG. 2 is a flowchart of an exemplary process for adapting the requesting of segment data over multiple simultaneous data connections; and FIG. 3 is a diagram showing an example series of segments, and FIG. 4 is a flowchart of an exemplary process for limiting active connections in support of a slower but more urgent delivery.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

Various embodiments are able to improve the performance of a client device that requests and receives data of a media stream using several simultaneous connections to one or more content sources. The client device suitably monitors the amount of data received on each connection, and adapts subsequent requests so that the amount of data requested on each connection is more proportional to the amount of data that the connection has been observed to deliver. If a player has three active connections, for example, and one stream is observed to deliver data at half the rate of the other two, then fewer data requests can be placed on the slower link so that the slower speed does not otherwise hamper performance. Equivalently, the amount of data referenced in each request placed on the slower link can be reduced so that the number of requests does not appreciably change, but the amount of data requested is still reduced. If one link is operating at half the rate of the other two links, for example, then 20% of the segment requests could be made on the slower link, and 40% of the requests could be made on each of the other two links. Conversely, the same number of requests could be made on each link, but the size of the data referenced in each request on the slower link could be cut in half, thereby producing an equivalent effect in reducing bandwidth on the slower connection. By requesting half as much data on the slower link, the impact of the slower performance is reduced or eliminated.

Further embodiments could additionally or alternately scale back the data requested on the faster connections if an urgent request has not yet been processed on a slower connection. That is, if a needed segment has not yet arrived on a particular connection for any reason, then the other connections could be throttled back to increase the resources available to the slower but more urgent request. Other examples, enhancements, alternatives and other features are provided below.

Turning now to the drawing figures and with initial reference to FIG. 1, an exemplary system 100 to adaptively deliver media streams to client device 120 using multiple connections 131, 132, 133 over a network 125 is shown. System 100 suitably includes an encoder 102 and a media server 114. The various components shown in FIG. 1 may be jointly provided by a common service provider, or different service providers may work together to provide different components of the system 100. A television network or other content provider could provide content that is already encoded in the appropriate formats, for example, thereby obviating the need for a separate encoder 102 in some implementations. Similarly, unicast and/or multicast hosting could be performed by any sort of content delivery network (CDN) or other service 114, as appropriate.

Encoder 102 is any device or service capable of encoding media programs 104 into one or more adaptive streams 105A-C. In the exemplary embodiment shown in FIG. 1, encoder 102 is a digital computer system that is programmed to create multiple streams 105A-C each representing the same media program 104 in its entirety. Typically, each stream 105A-C is made up of smaller segments 106 that represent a small portion of the program in a "streamlet" or other single data file. Each stream 105A-C is typically encoded so that segments 106 of the different streams 105A-C are interchangeable with each other. That is, a client media player 120 can mix and match segments 106 from different streams 105A-C to continue seamless playback even as network conditions or other resources change.

Generally, the sets of segments 106 making up each stream 105 are stored on a content delivery network (CDN) or other server 114 for distribution on the Internet or another network 125. Typically, a media player application 130 executing on one or more client device 120 contains intelligent logic to select appropriate segments 106 as needed to obtain and playback the media program 104. As noted above, segments 106 may be interchangeable between streams 105 so that higher bandwidth segments 106 may be seamlessly intermixed with lower bandwidth segments 106 to reflect changing network or other conditions in delivery over network 125. In some implementations, the media player 130 initially obtains a digest or other description of the available segments so that the player itself can request the segments 106 as needed. Often, such requests can be processed using conventional hypertext transport protocol (HTTP) constructs that are readily routable on network 125 and that can be served by conventional CDN or other web-type servers 110.

Although FIG. 1 shows only a single server 114, many implementations could spread streams 105 and/or segments 106 across any number of servers 114 for convenient delivery to device 120 located throughout network 125. The multiple data connections 131, 132, 133 could be established with a common server 114, or with different servers 114 depending on the particular embodiment.

Each client device 120 is any sort of device capable of receiving streaming media content via network 125. In various embodiments, client device 120 could be implemented with a mobile phone or other portable device, a computer system executing a media player application 130, a tablet or notebook computer, a video game player, a standalone media player, a television or television receiver, a video recorder and/or any number of other consumer-controlled devices. To that end, each client device 120 is typically a consumer owned and operated device with a conventional processor 134 or the like along with associated memory 135 or other data storage. Client device 120 also includes appropriate interfaces 136 for user interaction, network access and other input/output features as desired. Various client devices 120 may be equipped with any conventional hardware or software capabilities that are conventionally found in consumer electronics or personal computing products, or the like.

As stated above, each client device 120 typically executes its own media player software 130 that is able to adaptively request segments 106 belonging to any of the different streams 105A-C associated with a program 104 that is being presented to the viewer. By requesting segments 106 that were encoded using different parameters, the media stream being provided to the media client 130 can be adjusted "on the fly". As conditions dictate, each media player 130A-C is able to reduce demands on system resources by requesting lower bandwidth segments 106, by redirecting segment requests to different servers 114 or CDNs, or by taking other actions as appropriate. In still further embodiments, the media player 130 is able to manage the various connections 131, 132, 133 to servers 114 so that needed data can be delivered more efficiently and in a timely manner.

In many media streaming applications, each client device 120 establishes multiple simultaneous connections 131, 132, 133 with one or more servers 114. Typically, various portions of segments 106 (also called "segment fragments" or simply "fragments") are requested on each of the different connections 131-133 to provide redundancy and adaptability. Each connection may be, for example, a transmission control protocol (TCP) connection between the client 120 and the server 114. Such connections are typically reliable, but different routers or other devices in network 125 can treat traffic on each connection differently due to the inherent properties of the protocol.

Establishing multiple simultaneous connections 131-133 provides redundancy in the sense that if one connection fails or slows due to router issues, network congestion or other factors, then another connection can often be expected to carry the extra load. Traditionally, segments 106 are selected by the media player application 130, and a fragment of the segment 106 is requested on each available connection 131-133. If three connections 131-133 are available, for example, then the segment 106 may be conceptually divided into three fragments so that one of the fragments (representing a third of the segment 106) is requested on each of the available connections.

Rather than simply requesting the same amount of data on each connection 131-133, various embodiments improve performance by issuing requests for fragments or other segment data on each connection 131-133 on a proportional basis so that slower connections receive requests for less data and faster connections receive requests for proportionally more data. If connection 131 is found to be slower than the other connections 132 and 133, for example, then the segment requested on connection 131 can be made smaller relative to the segments requested on connections 132 and 133. If connection 131 is observed to have a 200 kbps throughput, for example, while connections 132 and 133 are observed to have a 400 kbps thoughput, then the sizes of the fragments requested on each connection could be scaled so that connection 131 requests 20% of the segment data while connections 132 and 133 each request 40% of the segment data. This is simply one example to illustrate the concept of proportional delivery; other embodiments could operate in any other manner to scale the amount of data provided on each connection 131-133 based upon observed capacity of the connection.

Turning now to FIG. 2, an exemplary process 200 for delivering a media program 104 to a media client device 120 suitably includes various functions 202-210 that can be carried out by the media player application 130 in media player device 130. The various functions shown in FIG. 2 are generally implemented using software instructions that are stored in memory or other non-transitory storage and that are executed by processors at client 120 and/or server 114, as appropriate. Although FIGS. 1 and 2 show a single client device 120, in practice the various functions shown for device 120 would typically be replicated and simultaneously performed by numerous devices 120 operating within system 100.

In the exemplary process 200 shown in FIG. 2, client device 120 establishes connections 131-133 (function 2020) over network 125 and requests media segments 106 (or any portion/fragment thereof) from one or more servers 114 over each connection (function 204). As noted previously, each connection 131-133 is a conventional network session or the like, such as a TCP connection. In such embodiments, data from segments 106 may be requested using HTTP or other conventional mechanisms. Server 114 responsively provides the requested data, again using conventional media delivery mechanisms such as HTTP delivery over TCP (e.g., conventional HTTP "get" and "put" constructs). Any number of simultaneous connections may be established (function 208) as desired.

Data delivered via each connection 131-133 is monitored (function 206) so that the media player 130 can track which connections 131-133 provide more or less segment data. The monitoring function may be performed in any manner; in various embodiments, the amount of data received in a read I/O cycle or the like is tallied for an appropriate period of time, and the aggregated amounts of data received via each connection 131-133 can be compared. Other embodiments may simply count the number of segments 106 or segment fragments that are received during the relevant time frame. The particular time frames used to evaluate and compare the simultaneous connections 131-133 may be determined in any manner. In various embodiments, the analysis continues during streaming so that real time (or at least approximate real time) receipt data can be used to schedule future requests. Generally speaking, it would be desirable to update the data analysis on a relatively frequent basis since network conditions and the like can quickly change for the better or the worse. It is generally desirable to respond to a deteriorating connection quickly, or to quickly take advantage of any increased bandwidth that may become available.

To that end, the media player 130 is able to adapt requests placed on each connection in response to that connection's monitored ability to deliver data (function 210). As a connection 131, 132 or 133 slows, the relative number of data requests issued on that connection can be reduced accordingly, and/or the amount of data requested in each request can be reduced. Conversely, any additional bandwidth that becomes available can be used for additional requests or for requests for larger amounts of data with each request. By matching the requests to the monitored capability of the data connection 131-133, data delivery can be optimized (or at least improved), thereby potentially improving throughput and improving the viewer experience.

The particular examples described herein may be modified or enhanced in any manner. The discussion herein frequently refers to multiple simultaneous streams 131-133 that are established in groups of three for consistency and simplicity. In practice, however, equivalent embodiments may different number of streams, ranging from two simultaneous streams to ten or more streams, as desired. Data monitoring may take place using any technique, and the adapting of requests may take other forms as well. It is not necessary, for example, for the data requests to exactly parallel the monitored data delivery rates of each connection; other embodiments may make incremental upward or downward adjustments, for example, to avoid rapid shifts in operation. Still further embodiments may not necessarily consider the relative proportion of data delivered by each connection, but may instead simply compare the amount of data received on a connection to a threshold value or the like. Such a threshold may be empirically determined, or determined through experimentation or other techniques. Again, many equivalent embodiments could make any number of modifications to the examples described herein.

Further embodiments could additionally or alternately adjust the priority of the multiple connections 131-133 in response to the urgency of undelivered data that has been requested on one of the connections. Referring now to FIG. 3, the media stream 300 that is played back by the media player 130 is typically made up of a series of segments 106A-N that are selected and requested by the player 130. As noted above, the various segments 106 can be "mixed and matched" between different sets 105A-C of segments 106 all representing the same program 104, and arranged in order according to a shared time index for playback, as shown in FIG. 3. Each segment 106 could represent, for example, two seconds or so of the media program 104 encoded at the appropriate quality level for then-current network and player conditions. Media player 130 requests fragments of the various segments 106A-N using the multiple simultaneous connections, as discussed above.

If a requested segment 106 in stream 300 is not available on time, however, a stall in playback could occur since content that would be needed to continue stream 300 is not available. At time 302 in FIG. 3, for example, playback of the media stream 300 would typically require segment 106B to be received in its entirety and buffered for immediate processing. If segment 106B or any fragment thereof had not yet arrived, then playback could be held up until the missing data arrives, thereby having an adverse effect on the user experience. Various embodiments could take any number of corrective actions to prevent this from occurring.

As shown in FIG. 4, media player 130 could execute a process 400 to identify any urgent yet undelivered data fragments before the data is needed for playback. Typically, it is desirable to buffer at least a few seconds ahead of the current playback to account for unpredictable network issues, player issues, or the like. At some point in time prior to playback, the media player 130 suitably verifies that all of the needed data for each of the segments 106 has been received. This could occur, for example, just a few seconds prior to playback, or even a minute or so prior to playback to ensure enough time to take corrective action.

Function 402, then, involves media player 130 verifying that all of the segments 106 or segment fragments needed for some appropriate time frame have been received. If the "urgent" time window is considered to be, e.g., ten seconds or so and each segment contained two seconds of media content, then any portion of the five segments following the currently-processed segment 106 could be considered "urgent". Other embodiments could use other parameters for determining urgency, segment durations, and the like.

If all of the urgent segments 106 have been received in their entirety (function 404), then processing continues normally to decode the received segments 106 for playback (function 408). If one or more urgent segments 106 are still missing, however, then the media player 130 could take remedial action as appropriate (function 406).

In various embodiments, media player 130 prioritizes the delivery of any urgent yet undelivered segment data by adapting the requests placed on one or more of the three simultaneous connections 131-133. If the urgent data has already been requested on connection 131, for example, then requests on connections 132 and/or 133 could be temporarily suspended to make more bandwidth available for the urgent data on connection 131. Indeed, active requests previously made on connections 132 and/or 133 could be cancelled to further reduce bandwidth consumption by the other connections. Active requests could be cancelled using, for example, HTTP constructs to abort an HTTP "get" request, or the like.

In some situations, a faster connection 132 and/or 133 could be enlisted to obtain a replacement or backup for the undelivered data. The replacement data may be of lower quality in some situations to further increase the likelihood of speedy delivery, since lower quality segment data will typically take less time and bandwidth to deliver than a higher quality segment data. Other embodiments may consider other factors or take other actions as desired.

To that end, the player could issue a priority request on one of the faster connections 132 or 133 to obtain the missing segment data. In such cases, the priority request could be processed ahead of any other requests that may be pending on those connections 132, 133. Priority requests may be implemented using HTTP structures or the like.

Further, it may be desirable in some embodiments to re-request any additional segment data on the faster connections 132, 133 that had been previously requested on the slower connection 131. If a connection 131 has already failed to deliver urgent segment data, then it is likely that the connection has been broken or stalled, or that some other issue is preventing delivery of any other data requested on that same connection. Hence, it may be desirable to issue backup requests on the more reliable connections 132, 133 until the issue can be resolved and processing returns to a steady state, or until the slower connection 131 can be terminated or replaced. Such backup requests could pre-empt or even cancel previously-placed requests for subsequent data on the faster connections, as appropriate. Various other techniques could be equivalently applied, as desired.

The foregoing discussion therefore considers several different systems, devices and methods to improve the delivery of data making up an adaptive media stream through active manipulation of multiple simultaneous network connections. These general concepts may be expanded or modified as desired to create any number of alternate but equivalent embodiments.

The term "exemplary" is used herein to represent one example, instance or illustration that may have any number of alternates. Any implementation described herein as exemplary is not necessarily to be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is presently claimed is:

1. A method executable by a media player device to proactively obtain a media stream that comprises of a series of segments via a network, the method comprising:

placing a plurality of segment requests by the media player device for segment data that is to be delivered to the media device, wherein each of the segment requests is placed on one of a plurality of simultaneous parallel connections via the network;

after placing the requests, the media player device monitoring delivery of the previously requested segment data on each of the plurality of simultaneous parallel connections to thereby identify undelivered segment data that is urgent and that was previously requested on a particular one of the plurality of simultaneous parallel connections, but that has not yet been delivered; and if the monitoring indicates that the undelivered segment data has not yet been received, the media player suspending the requests for additional segment data on the simultaneous parallel connections other than the particular one of the simultaneous parallel connections that is delivering the previously-requested but undelivered urgent segment to reduce an amount of bandwidth consumed by the other simultaneous parallel connections and thereby give priority to the previously-requested but undelivered urgent segment data on the particular simultaneous parallel connection.

2. The method of claim 1 further comprising the media player adapting subsequent requests for segment data based upon the monitored delivery of the requested segment data on each of the plurality of simultaneous parallel connections by matching the amount of data requested on each of the simultaneous connections to the delivery rate for that simultaneous connection.

3. The method of claim 2 wherein the relative amount of segment data requested on each of the simultaneous connections substantially matches the monitored amount of data delivered on that simultaneous parallel connection.

4. The method of claim 1 wherein the relative amount of segment data requested on each of the simultaneous connections substantially matches the monitored amount of data delivered on that simultaneous parallel connection.

5. The method of claim 1 further comprising the media player adapting subsequent requests for segment data based upon the monitored delivery of the requested segment data on each of the plurality of simultaneous parallel connections by cancelling an active segment data request on at least one of the other simultaneous parallel connections to thereby give priority to the simultaneous parallel connection that is delivering the undelivered urgent segment data.

6. The method of claim 1 further comprising the media player adapting subsequent requests for segment data based upon the monitored delivery of the requested segment data on each of the plurality of simultaneous parallel connections by requesting replacement segment data that corresponds to the undelivered segment data but that has a lower quality than the undelivered segment data via one of the other simultaneous parallel connections.

7. A data processing system for playing media content received as an adaptive stream comprising a plurality of sequential segments from a content source via a network, the data processing system comprising:
an interface to the network; and
a processor configured to establish a plurality of simultaneous parallel data connections to the content source via the interface, to place requests for data of the sequential segments of the media stream via each of the plurality of simultaneous parallel connections, to monitor delivery of the previously requested segment data on each of the plurality of simultaneous parallel connections to thereby identify undelivered segment data previously requested on a particular one of the plurality of simultaneous parallel connections that is urgent, but that has not yet been delivered, and, if the undelivered segment data is identified, to suspend the requests for segment data on the simultaneous parallel connections other than the particular one of the simultaneous parallel connections to reduce an amount of bandwidth consumed by the other simultaneous parallel connections and thereby give priority to the previously-requested but undelivered segment data on the particular simultaneous parallel connection.

8. The data processing system of claim 7 wherein the processor adapts subsequent requests for previously-requested segment data based upon the monitored delivery by matching the amount of data requested on each of the simultaneous connections to the delivery rate for that simultaneous parallel connection.

9. The data processing system of claim 8 wherein the relative amount of segment data requested on each of the simultaneous parallel connections substantially matches the monitored amount of data delivered on that simultaneous parallel connection.

10. The data processing system of claim 7 wherein the relative amount of segment data requested on each of the simultaneous parallel connections substantially matches the monitored amount of data delivered on that simultaneous parallel connection.

11. The data processing system of claim 7 wherein the processor adapts subsequent requests for previously-requested segment data based upon the monitored delivery by cancelling an active segment request on at least one of the other simultaneous parallel connections to thereby give priority to the simultaneous parallel connection that is delivering the identified urgent segment data.

12. The data processing system of claim 7 wherein the processor adapts subsequent requests for previously-requested segment data based upon the monitored delivery by requesting replacement segment data that corresponds to the undelivered segment data but that has a lower quality than the undelivered segment data via one of the other simultaneous parallel connections.

* * * * *